Dec. 1, 1959  J. KURMER  2,915,203
VEHICLE PARKING EQUIPMENT
Filed Dec. 11, 1956  5 Sheets-Sheet 1

RECEIVING STALL

Fig.3

INVENTOR.
JOHN KURMER
BY

Dec. 1, 1959              J. KURMER              2,915,203

VEHICLE PARKING EQUIPMENT

Filed Dec. 11, 1956                            5 Sheets-Sheet 2

INVENTOR.
JOHN KURMER

Dec. 1, 1959 J. KURMER 2,915,203
VEHICLE PARKING EQUIPMENT
Filed Dec. 11, 1956 5 Sheets-Sheet 3

INVENTOR.
JOHN KURMER
BY

United States Patent Office 2,915,203
Patented Dec. 1, 1959

2,915,203

VEHICLE PARKING EQUIPMENT

John Kurmer, Philadelphia, Pa.

Application December 11, 1956, Serial No. 627,671

19 Claims. (Cl. 214—16.1)

The present invention relates to equipment for automatic storing and subsequent delivering of rollable vehicles or other articles which have a discrete or generally regular size and shape, and are mounted to roll freely from one position to another. The invention has been developed and particularly designed for use in parking or storing motor vehicles and, for this reason, the following disclosure will relate primarily to that field of usefulness, but I wish it to be understood that the principles of the invention are intended to be applicable to the automatic storing and subsequent delivery of other things than motor vehicles.

In present day congestion of city traffic, the parking of cars has presented a problem which has gone through stages of street parking, parking lots and multi-floored drive-in buildings, with ramps from floor to floor. Street parking means leaving one's car on the highway which should be free for traffic. Parking lots handle cars with little regard for ordinary protection from damage while specially equipped drive-in buildings cannot afford sufficient qualified help capable of delivering cars to waiting owners in a reasonable time. All of such systems have car damage to contend with.

Other attempts have been made to solve this parking and storage of motor vehicles such as special buildings equipped with elevators for taking the vehicles to storage stalls on different floors, such elevators being manned by operators in the usual manner and also requiring the operator or an assistant to transfer the vehicle from one place to another. Also complicated tiltable ramp assemblies have been proposed whereby a vehicle can travel by gravity under manual control for transfer to or from an elevator. All such contrivances require attendants to manipulate the intricate manual levers, elevator guards, and accessory platforms. None of the proposed systems, insofar as applicant is aware, has successfully provided for a transfer of a car from one ramp to another by a positive coupling resulting in a continuous two-part ramp capable of tilting as a unit for a required reception by or discharge from an elevator.

The principal object of the present invention is to provide a parking system for motor vehicles wherein all of the foregoing disadvantages have been eliminated and wherein a vehicle can be received on an elevator, carried by the elevator to a selected floor and delivered to a storage stall without requiring operators or car attendants.

Another object is to provide a parking system wherein a ramp in a stall can be interlocked with a ramp on an elevator for transfer of a car from one to the other by gravity.

It is also an object to provide a parking system wherein electrical circuits operate in a predetermined cycle to transfer a car from a receiving stall, to an elevator ramp, cause the loaded elevator to rise to a selected floor, and discharge the car into a particular storage stall and vice versa.

A further object is to provide a parking system wherein the driver of a car can enter a receiving stall, check the condition of his car for brake and gear release, lock the car, deposit a coin in a panel of an electrical program system, remove a key which identifies the particular stall in which his car is to be stored, and then leave the car to be automatically handled and delivered to said stall. When the driver returns for his car, the panel meter indicates the storage toll whereupon by inserting the key and the required coins the system operates in reverse and brings the car back to be driven away.

A still further object is to provide a car parking system wherein means operates to prevent a car from being started on its way in a parking cycle unless the driver has fulfilled the proper initial steps, more particularly the releasing of brakes and placing gears in neutral. Such improper conditions are sensed by means which prevents the driver from removing the control key of the sequence panel until the conditions have been corrected.

Other objects and features of advantage of the invention will be found throughout the following detailed description of the invention particularly when considered with the accompanying drawings in which like reference characters refer to similar elements.

Figure 1:
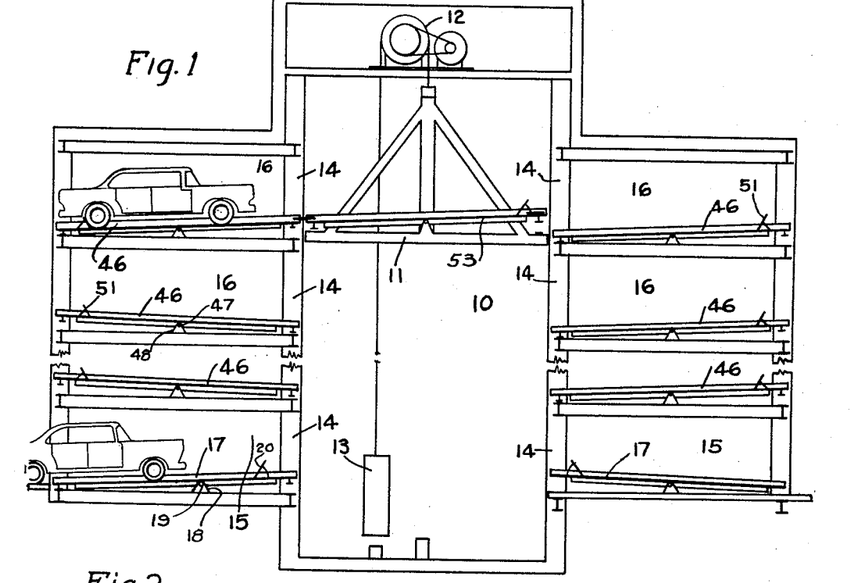
Fig. 1 is a fragmentary diagrammatic, elevation view of a vehicle storage building embodying one form of the invention.

Referring to Fig. 1 of the drawings, a preferred embodiment of the invention is shown comprising a vertically disposed elevator shaft 10, providing a guide way for an elevator platform 11, which is raised and lowered by any well known means such as a motor-driven windlass 12 with its associated counterweight 13. The shaft 10 terminates at its lower end below the ground level and is provided with side openings 14 at different floor levels. In the preferred form of the invention there are two such vertical rows of openings 14 respectively communicating with vehicle stalls, those stalls 15 at the ground level serving as receiving stalls and those 16 above serving as parking or storage stalls for vehicles handled by the elevator 11. For the purpose of this description but one side column of stalls will be considered because the opposite column is of like construction and similarly related to the operation of the elevator.

In order to initiate parking according to the invention the two open ended receiving stalls 15 (Figs. 1 and 2) are arranged in horizontal alignment with the receiving opening 14 to the elevator shaft 10, and open at the other end for the entrance of a vehicle. The floor of each stall 15 is provided with a ramp 17 here shown as two rails spaced apart to correspond to the transverse gauge of the wheels and extending substantially the length of the stall and terminating in close proximity to the entrance to the elevator shaft. The rails 17 of each ramp are pivotally mounted upon a rugged standard 18 rising from the floor and locating its ramp pivot 19 at approximately the ramp center. The two ramp pins 19 are horizontally in register. The disposition of the vehicle is such that when it is correctly located upon the ramps, the center of gravity of the vehicle will be upon the street or entering end of the stall 15.

Figures 7, 8, 9:
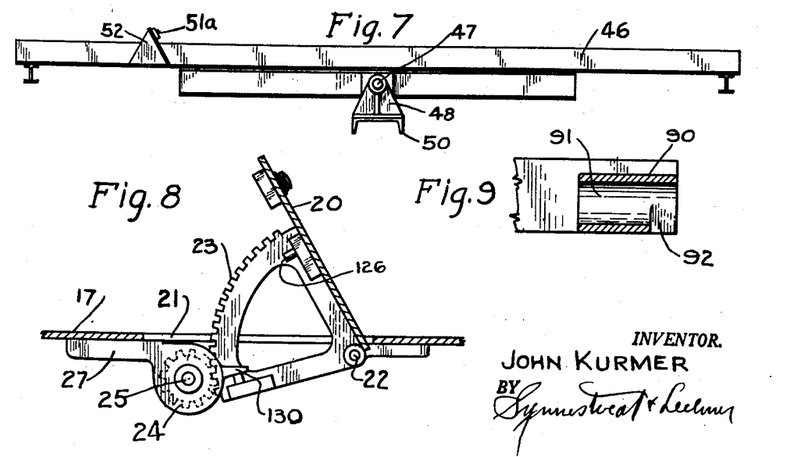
Fig. 7 is a side elevation view of the ramp of Fig. 6.
Fig. 8 is a detail view in vertical section of a car stop assembly viewed from one side of the ramp of Fig. 2, but illustrative of other such assemblies.
Fig. 9 is a detail view partly in section of one of the bolt sockets.
Figure 10:
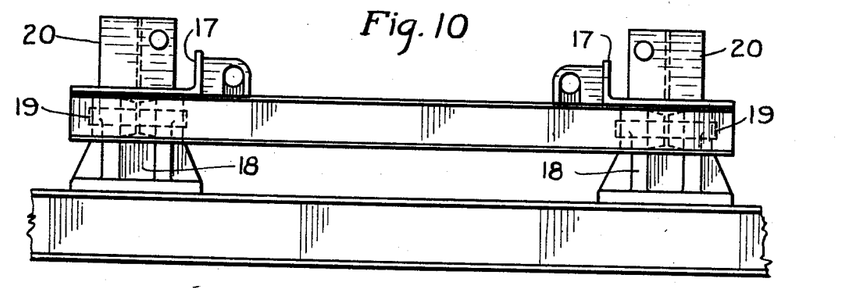
Fig. 10 is an end elevation view of the receiving stall ramp.

As a means for stopping the entering vehicle, the elevator end of the rail of each ramp 17 is provided with a rockable stop 20, contoured to seat, in its lowered level position, in a slot 21 of its rail. Preferably the stop 20 is carried by a quadrant (see Figs. 3 and 8) pivoted at 22 to its ramp rail and having a gear segment 23 in mesh with a pinion 24 which is keyed or otherwise made fast to the shaft 25 of a source of power such as a reversible electric motor 26. The pinion 24 is journalled in a bracket 27 bolted to the ramp in proper position to maintain the pinion in mesh with the gear segment 23. It is to be understood from the foregoing that there are two such stops 20 in horizontal alignment on the respective rails having the motor 26 as a common actuating means for the two pinion gears 24, both on shaft 25. For convenience and practicability, the motor 26 is supported between the two ramp rails with its driven shaft 25 projecting from opposite ends. One of stops 20 is equipped with switches 126 and 130 to limit their travel. Other stops are similarly equipped for proper sequence operation.

Figure 2:
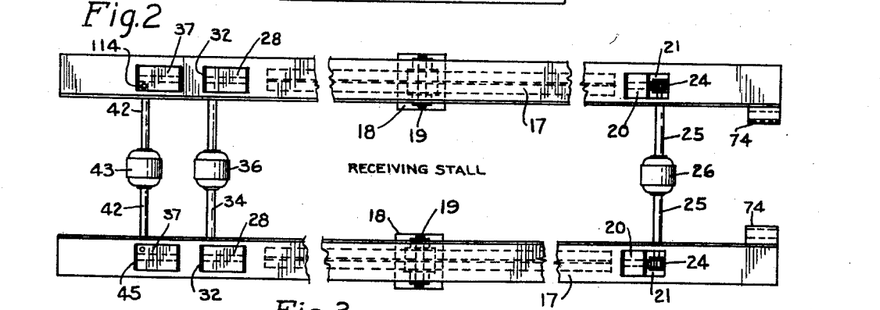
Fig. 2 is a plan view of the receiving stall ramp.
Figure 3:
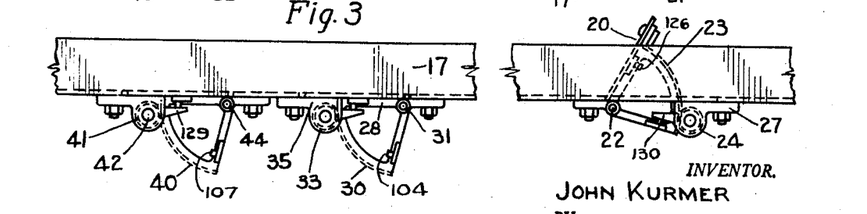
Fig. 3 is a side elevation of the ramp of Fig. 2.

When the vehicle has entered the stall 15 and is halted by the stops 20, which are initially raised for this purpose, the unbalanced loaded ramp 17 would cause the vehicle to roll backward, so means are provided to ensure the vehicle being held in rearward tilted position until ready for discharge to the waiting elevator. In the present instance, this holding means comprises a pair of stops 28 pivotally attached to the respective rails of the ramps 17 in horizontally aligned relation for contact with the rear wheel tires of the vehicle. Each of these stops 28 is similar to the stops 20, being carried by a quadrant including a gear segment 30 formed on a radius with the pivot 31 of the stop body as a center, such pivot 31 being supported in suitable bearings carried by its ramp 17. The two stops 28 respectively swing through openings 32 in the ramp 17 to alternately take stop positions in the plane of the ramp 17 according to the time cycle of operations. Each gear segment 30 is in mesh with its associated driving pinion 33 keyed to opposite ends of an actuating shaft 34 and respectively supported by bearing brackets 35 bolted to the respective rails of the ramp 17. The shaft 34 is driven by a reversible motor 36, mounted between the pair of rails for simultaneous raising and lowering of the two stops 28.

Preferably a mechanism is provided for sensing or checking when the vehicle is ready to leave the receiving stall 15, such mechanism, in association with a circuit to be described, comprising a second pair of stops 37 respectively located upon the rails of the ramp 17 between the pair of stops 28 and the entrance to the stall 15, and serving to engage the rear wheels of the vehicle when the stops 28 have been lowered in the initiating cycle of positioning the vehicle. In the present instance, these sensing stops 37 are of like construction and operating means to the pairs of stops 20 and 28, and can briefly be described as controlled by quadrant bodies each with its segment gear 40 meshing pinion 41, shaft 42 and reversible motor 43, with each quadrant body having a pivot 44 on the ramp 17. Each stop 37 swings through its provided slot 45 in its ramp rail as will be understood. The functioning and control of this sensing mechanism will be described in detail hereinafter, but it will be understood that the two pairs of stops 28 and 37 are in lowered position to permit entrance of the vehicle to the stall 15, while the pair of stops 20 are raised to limit the inward travel of the vehicle.

Figure 6:
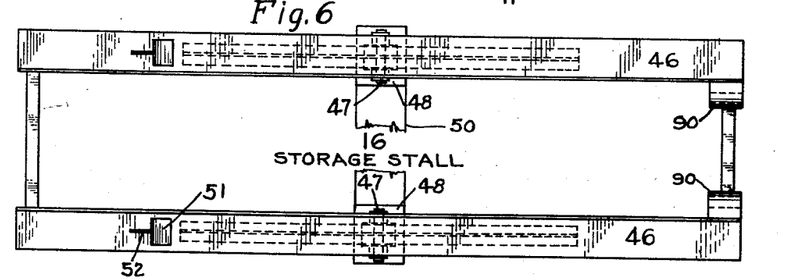
Fig. 6 is a plan view of a ramp for a storage stall.

Referring now to one of the storage stalls 16 as illustrating the ramp construction of the others (see Figs. 6 and 7), the stall opens into the elevator shaft 10 and presents the outer ends of a ramp comprising preferably a pair of angle ramp rails 46 in position for cooperation with the elevator ramp controls as will be explained. The rails 46 are supported as a pair unit tiltable about horizontally aligned pivots 47 journalled in bracket standards 48 which are anchored to and rise from transverse channels 50, carried by the building frame columns, said channels 50 being located in the center of storage stalls 16. The rail unit is so eccentrically balanced that its elevator end is normally down and it terminates in close proximity to the plane of the inner wall of the elevator shaft. At the rear end (i.e., remote from the elevator), a pair of stops 51 are arranged in horizontally aligned relation, one on each rail and respectively inclined by a supporting strut 52 for proper abutting with the incoming pair of vehicle wheels. The location of stops 51 is such that the center of gravity of a vehicle on the ramp rails is on the opposite side of the pivots from the elevator end so that in stored position the vehicle is tilted towards the rear end of the stall 16.

Figure 4:
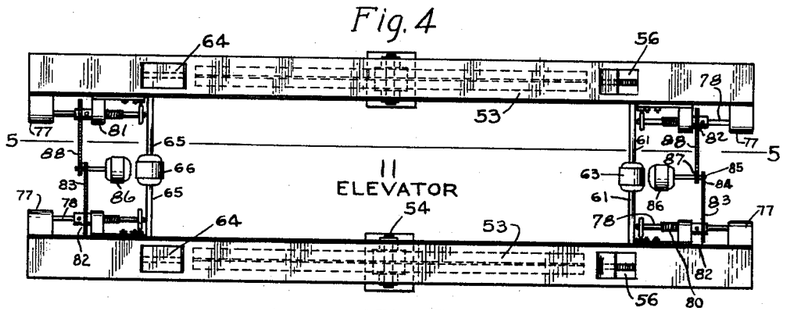
Fig. 4 is a plan view of the elevator platform.

Referring now to the elevator assembly (Figs. 4 and 5), its platform 11, is provided with a tiltable frame forming a support for a ramp in the form of a pair of rails 53 arranged endwise between the open ends of the platform and spaced in parallel relation to match the tread spacing of the vehicle wheels. This rail frame is carried by pivots 54 respectively supported by bracket standards 55 rising from and attached to the mid-point of platform 11. Due to counterweighting, the state of unbalance is such that the rails, when unloaded, are tilted down at one end of the platform. In this embodiment the down end is opposite to the column of stalls under discussion. It will be understood, of course, that the unloaded elevator ramp could be arranged to tilt in the opposite direction if so desired. To retain the vehicle against displacement when loaded on the elevator ramp, a pair of stops 56 are provided, one for the rear end of each rail 53, but in horizontally aligned relation for abutment by the incoming pair of vehicle wheels. Preferably these stops 56 are like those described for the other ramp stops, each having an actuating quadrant including a gear segment 57 formed on a radius with the pivot 58 of the stop as a center, such pivot 58 being journalled in bearings bolted to the ramp rails 53. These stops 56 respectively swing through openings provided in the ramp in order to alternately take stop positions in the path of the vehicle and retracted out of such path. Each gear segment 57 is in mesh with its associated driven pinion 60 keyed respectively to opposite ends of a driving shaft 61, which is journalled in bearing brackets 62 bolted to the respective ramps 53. The shaft 61 is arranged to be driven by a reversible motor 63, mounted conveniently between the pair of rails 53 as a common drive for the stop actuating pinions 60. Also a pair of gear segment stops 64 are pivotally mounted at the opposite ends of the rails 53, such stops 64 being timed independently of the stops 56 to raise and lower according to the cycle. In receiving position of the elevator these stops 64 will be in lowered position while the stops 56 will be raised to be in the path of the incoming vehicle. This pair of stops 64 is actuated by shaft 65 driven by a reversible motor 66 under circuit control and are under like quadrant control as described.

One of the features of the invention resides in the novel means for interconnecting the elevator ramp 53 with either the pair of rails 17 or 46, such inter-connection in each case resulting in the alignment of the rails 53 with one or the other ramp pair according to whether the elevator is loading or unloading at the receiving stalls or storage stalls. With either connection completed the interlocked ramps can be tilted as a unit upon motion of one of them so that the vehicle rides by gravity in the selected direction. In describing this inter-connecting mechanism the coupling between the receiving ramp and the elevator ramp will be more specifically defined while the others which are similar will be more generally considered.

Figure 11:
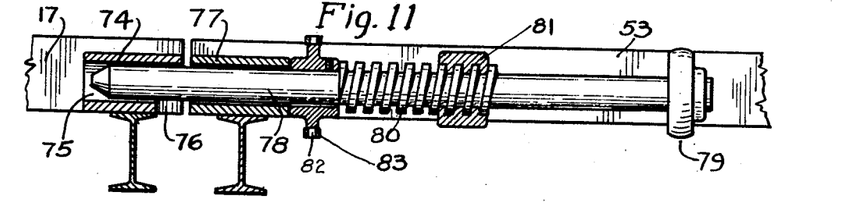
Fig. 11 is a detail view, on an enlarged scale and partly in section of one of the bolt coupling units.

In the preferred form the elevator ends of the ramp 17 of receiving stall 15 respectively mount bolt receiving members 74 (Fig. 11) each attached to the upstanding angle side of a rail and having a horizontally disposed tubular part forming a bolt receiving socket 75 with a communicating bottom slot 76 at its entrance end. The two members 74 are mounted to locate the pair of sockets 75 in close proximity to the end of the receiving stall 15 for juxtaposed alignment with the respective bolting units on the adjacent end of the elevator rails 53. Each of these elevator ramp ends carries a bolt assembly 77 forming a guide for a reciprocable slide bolt 78, which is arranged to enter its associated socket 75 when the elevator takes a position with the two end sockets 75 and the bolts 78 in registered relation. This registered position takes place when the projected bolts ride into the slots 76 as a guide to socket and bolt alignment.

For reciprocating the bolts 78, each is provided with a feed screw 80 which is threaded through a leader nut 81 fixed to ramp rail 53, while a sprocket 82 is keyed to its bolt 78 and is driven by a sprocket chain 83 passing over a second sprocket 84 (Fig. 4) keyed to the shaft 85 of a reversible motor 86. Another sprocket 87 is also keyed to the motor shaft 85 to drive the sprocket 82 of the other bolt 78 which is on the other rail and driven by chain 88. Thus the motor 85 is mounted conveniently between the two elevator ramp rails 53 for simultaneous projecting of both bolts.

With the foregoing in mind the coupling of the elevator ramp with the receiving ramp is accomplished by an electrical program system for proper sequence timing whereby the elevator windlass 12 is given an initial start to lift the elevator while at substantially the same time, when the elevator is just below the receiving ramp, the bolt operating motor 86 is energized to project the rail bolts 78 far enough to enter the guide slots 76. The elevator rises until the two ramps are linearly aligned and so brings the bolts into register with the sockets 75. When this occurs the control circuit is closed causing elevator to stop and energizing the motor 86 to thereby further project the bolts into the sockets for coupling relation with the meeting ends of the ramps 17. The chain drives are sufficiently flexible to permit the sprockets 82 to move back and forth between the leader nut 81 and the inner end of the bolt sleeve 77 which act as stops and are spaced apart just far enough to insure the required throw of the bolts 78 into and out of coupling position. With the coupling completed the circuit control operates the elevator windless to lower the elevator whereupon the power of the moving elevator causes the coupled ramps to be angularly tilted as a unit to the discharge position so that the vehicle discharges by gravity upon the elevator ramp, where it is brought to a stop by the stops 56. With the transfer accomplished, control circuits actuated by the vehicle reverse the bolt motor 86 to retract the bolts 78 so that the ramps are uncoupled and the loaded elevator can rise for positioning with respect to the selected storage stall 16.

In connection with the foregoing it should be noted that use of the power and motion of the elevator itself to effect the tilting of the coupled ramps avoids the need of providing additional means for this purpose.

Figure 5:
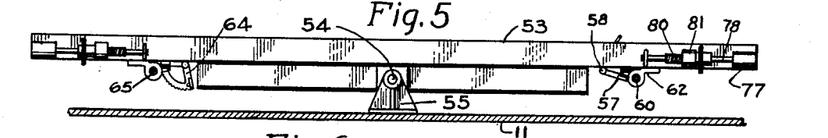
Fig. 5 is a side elevation view of the elevator platform.

The bolt assembly above described has been confined to the two sets at the end of the elevator platform which is juxtaposed to the receiving stall, or for storage stalls arranged floor by floor above and on the same side of the elevator shaft as the receiving stall. It follows therefore that where the elevator is to coact with stalls at the opposite side of the shaft, the juxtaposed end of the elevator platform and its ramp will be equipped with bolt operating means which are duplicates of those above described. For that reason the parts of the second set of bolt mechanisms on the elevator platform are identified respectively by the same reference numerals as used for the first set and the elevator platform is shown in Fig. 5 as having these mechanisms at both ends for selective use. It should be noted that in instances where the unloaded elevator ramp is to be aligned with a storage stall on the right hand side the operational movements of the elevator and of the bolt actuating mechanisms will have to be arranged to take into consideration the fact that the unloaded ramp normally tilts toward the left. This, however, is a simple problem well within the knowledge of one skilled in laying out sequentially acting circuit controls.

In describing the transfer of the vehicle from the elevator ramps 53 to the ramp rails 46 of any selected storage stall 16, it should be noted that the outer ends of the stalll rails 46 each have a bolt receiving unit 90 (Fig. 6) attached thereto which is similar to the bolt receiving member 74 carried by the ramps 17. Namely, each is provided with a bolt receiving socket 91 (Fig. 9) having a bottom guide slot 92 for initially bringing a bolt on the elevator into socket registering relation for the final coupling projection of a bolt 78. Thus as the loaded elevator nears the storage stall selected by the electric control, the motor 86 operates to eject the pair of bolts 78 to pilot position to enter the guide slots 92 and complete bolt and guide slot registration. When so registered the elevator linearly aligns the two ramps whereupon the bolt action is completed and the elevator moves in the proper direction to tilt the connected ramps to gravity discharge position at which time the elevator stops to permit the vehicle to ride down the incline where it strikes a control 51a on the limit stop 51 (Fig. 7), to cause the coupling bolts to be retracted while allowing the elevator to be free to rise or lower as ordered. While in describing the bolt assemblies the guide slots 76 and 92 have been located below the sockets for rising interlock they could as well be located above and be interlocked by the elevator moving downwardly. Also it is to be understood that each storage stall pair of ramps has the described coupling units for coaction with the elevator bolt control.

Figure 12:
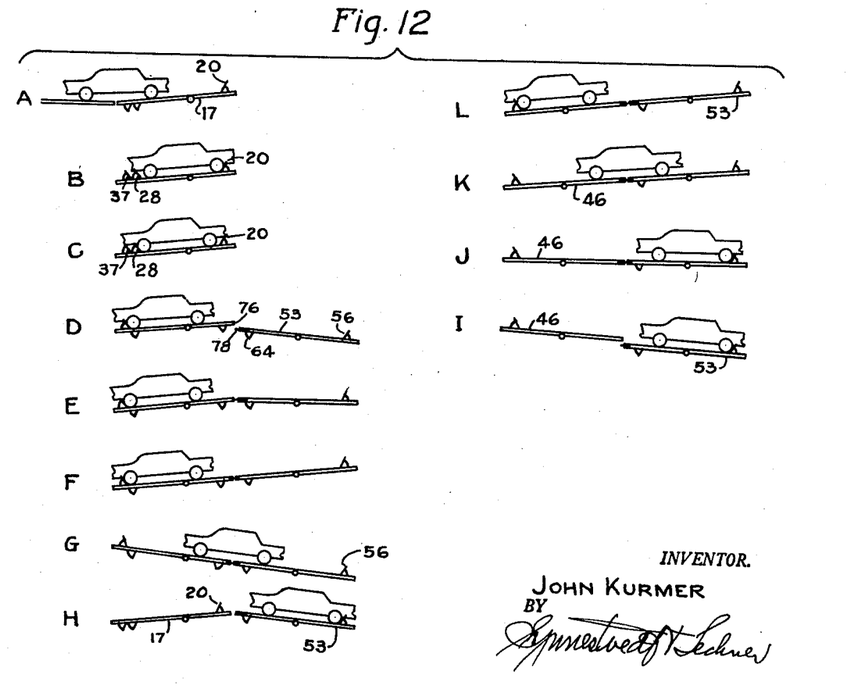
Fig. 12 is a schematic showing of a car handling cycle.
Figure 13:
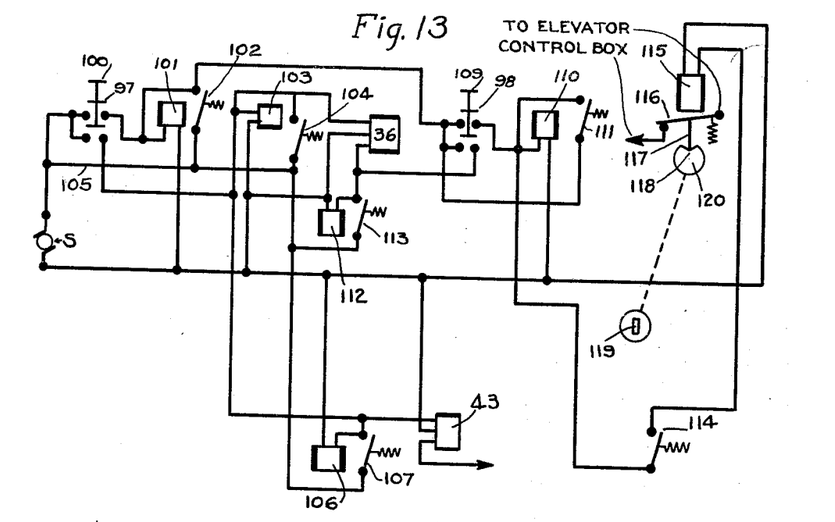
Fig. 13 is one control circuit for sensing car position in a receiving stall.
Figure 14:
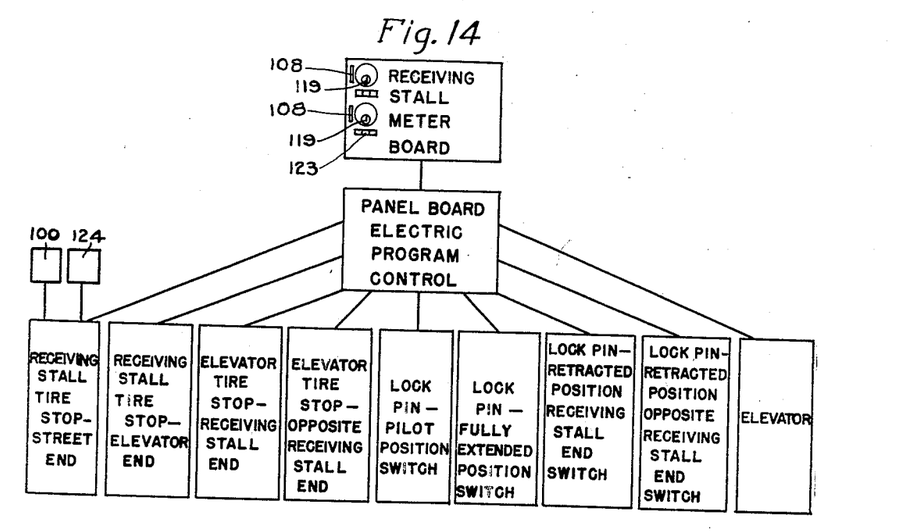
Fig. 14 is a block diagram showing the several position controls included in the program cycle.

For clear understanding of the controlled cycle of operations reference is made to the schematic showings of Figs. 12, 13 and 14 and the related sequence letters.

(A) Driver is entering receiving stall.

(B) Car completely on receiving stall ramp with front wheels touching stops 20. Driver reaches out window and presses control button 100 (Fig. 14) to operate motors 36 and 43 (Fig. 13) to elevate stops 28 and 37.

(C) Driver releases brakes and gears to permit car to roll back against stops 28. Displaced center of gravity keeps car in position.

(D) Driver alights and places coin in meter board. Now panel circuits cause motors 26 and 36 (Fig. 2) to lower stops 20 and 28, allowing car to roll to final position on the receiving ramp. Driver can now turn and remove his key. Also a control circuit causes elevator to take position just below receiving stall and projects the elevator bolts 78 to pilot position ready to enter slots 76 (Fig. 11) and also causes stops 56 on elevator to rise.

(E) Elevator is now rising to permit bolts and sockets to register for coupling.

(F) As elevator rises its ramp is tilted to align with receiving stall ramp and bolts complete projection.

(G) Elevator lowers to reverse the tilt of the coupled ramps and car rides by gravity onto elevator ramp to abut the end stops 36.

(H) Car completely on elevator ramp. (Receiving ramp 17 tilts back to receiving position with stops 20 again raised.)

(I) Elevator rising to approach selected storage stall. When elevator is just below selected storage stall bolts eject to pilot position.

(J) When bolts 78 engage slots 76 bolts complete projection. Elevator now rises and tilts linearly aligned and coupled ramps 53 and 46.

(K) Elevator has completed rise which reverses tilt of ramps and car rolls onto storage stall ramp 46.

(L) Car completely on storage stall ramp. Bolts are ready to retract to uncouple ramps whereupon elevator will be free to rise or lower according to order from circuit control.

Referring to Fig. 13 of the drawings an electric circuit is shown as illustrative of the sensing operation which serves to advise the control circuit whether the car is ready to be taken over by the parking system; i.e., the gears in neutral and the brakes off.

In the circuit shown the switch 104 is mounted in operative relation to one of the ramp stops 28 to be opened by a trip on the selected stop when it reaches raised position. Also switch 107 is mounted to be opened by one of the stops 37 when raised to limit position. Voltage is supplied from source S under control of two series connected double-pole switches 97 and 98 in association with control solenoids by which the respective stop actuating motors 36 and 43 function as properly timed in the cycle of operation.

The sequence of operations leading to the sensing notification to the control circuits as to whether driver has left his brake and/or gear engaged takes place as follows: The driver enters the receiving stall and brings the car to stop on the ramp 17 with front wheels abutting raised stops 20 and reaches out to press button 100 of switch 97 thereby closing the circuit to energize solenoid 101 and close switch 102, while at the same time, through lower contacts of switch 97, the solenoid 103 is energized to close switch 104. It should be noted that solenoids 101 and 103 remain energized even though button 100 retracts. This is because a supplemental positive lead 105 from source is joined to the arms of switches 102 and 104. The solenoid 103 is in parallel circuit with solenoid 106 controlling switch 107, both solenoids are energized to close the respective switches 104 and 107 and thereby start motors 36 and 43 to respectively elevate the two pairs of stops 28 and 37. As the stops 28 and 37 reach operative position, trips respectively thereon open switches 104 and 107 to stop both motors.

The driver now releases brake and gears so car rolls back to be held by the stops 28 and the driver can get out and lock the car doors. He places a coin in coin slot 108 on receiving stall meter board (shown in Fig. 14), and as the coin drops it momentarily hits circuit button 109 of double pole switch 98 to energize solenoid 110 to close switch 111 and also energize solenoid 112 to close switch 113. The closing of switch 113 reverses motor 36 and the pair of stops 28 lower so that car can roll back by gravity to be stopped by the rear raised stops 37 provided the driver has released brakes and placed gears in neutral. Thus there is an automatic notice to the control circuit that driver has or has not forgotten to provide for the free release of the car to gravity. The car must be left free to move as required before control circuit will permit continuation of parking cycle.

When the driver has followed the correct procedure of releasing brake and gears, the car rides back to be stopped by the still elevated stops 37 at which time a trip on one stop 37 engages one of the tires and closes switch 114 which is in a subcircuit including switch 111 and a solenoid 115 for actuating a spring biased armature 116. This latter carries a detent 117 arranged to enter a slot 118 in the cylinder 120 of a lock to be turned by a key projecting from a keyhole 119 in the receiving stall meter board. Since the switch 111 is still closed when the tire closes switch 114, the solenoid 115 is energized to retract the armature detent 117 so the driver can now turn his key and remove it. The turning of the key initiates the operation of the program control so that the successive circuits are closed in selected order by triggering contacts and switches which are responsive to ramp and elevator movements. Thus, as seen in Fig. 14, the panel board coacts to control stall car stops, elevator stops, lock pin operation for ramp connection in staged action, and all in synchronized relation to the elevator in its car pick-up and delivery functions.

In case the driver has forgotten to release the brakes there can be no backward movement of the car and since he cannot turn and remove the parking cycle key on the panel board until the trip circuit of stop 37 has closed he can enter the car, release the brakes and put the gear in neutral whereupon the car can ride back to parking stall position against the stops 37. However, while the circuit of this stop 37 has been closed at that place it is still open at the point controlled by the panel key. The driver is therefore in no danger of being carried off by the positioned car and can get out to turn and remove the panel circuit control key whereupon the starting cycle begins and he takes the key with him.

Figure 15:
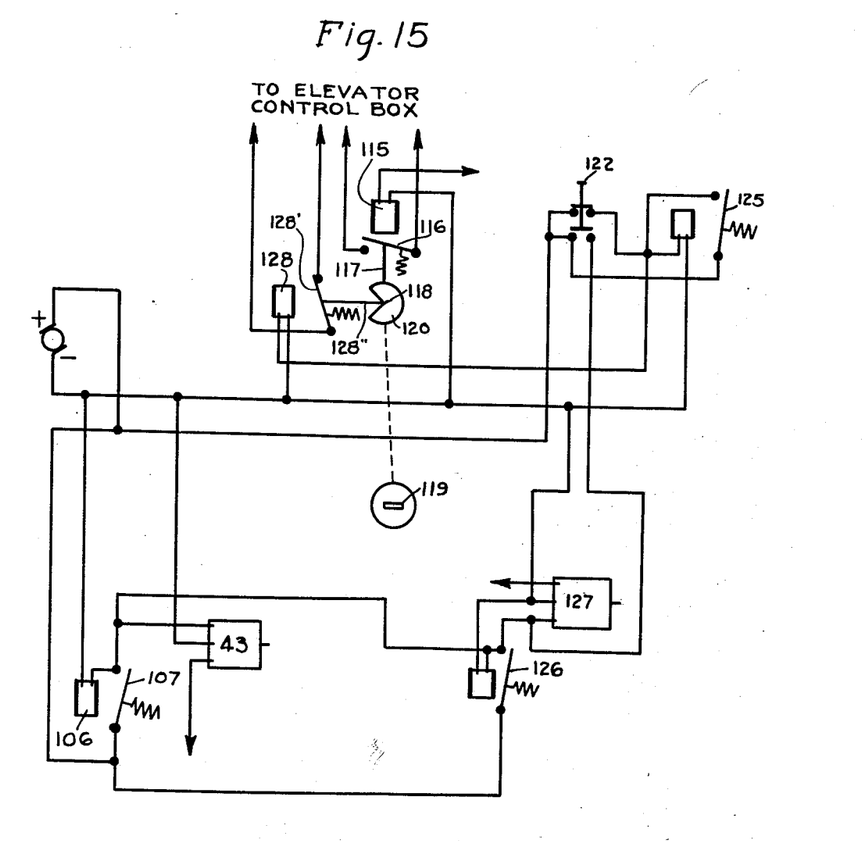
Fig. 15 is an electrical circuit as a modification of the circuit of Fig. 13 for a simplified understanding of the deparking cycle.

By reference to circuit diagram of Fig. 15 a deparking cycle can be followed whereby the car is removed from its parking stall and carried by the elevator into register with the outgoing stall. Thus when the driver returns to get his car he inserts his key in the keyhole 119 in which it belongs, looks at the counter 123 (Fig. 14) to ascertain how much charge is registered and deposits the proper amount of coins to meet this recorded charge. Counter is operated by a timing motor and is calibrated in dollars and cents. Counter had begun to register after the initial deposit, which was less than the minimum charge, had been used up.

When total of coins drop down their weight trips button 122 which energizes solenoids of switches 125, 107, and 126 which stay closed even after coins have passed on. Closing of switch 125 energizes solenoid 128 of switch 128' causing arm 128" of switch 128' to be pulled out of slot 118 permitting driver to turn his key and initiate depark cycle. Closing of switch 107 causes motor 43 to raise tire stops 37 until projection 129 engages with and opens switch 107. Closing of switch 126 causes motor 26 to retract tire stops 20 until projection 130 engages with and opens switch 126. Now tire stops 37 are up and tire stops 20 are down and receiving stall ramp is ready to accept car being deparked.

When key is turned plunger 117 goes into slot 118 closing contacts of switch 116 which asks elevator control box to send elevator to a position somewhat below the storage stall in which the desired car is parked whereupon the controls follow a prearranged sequence which causes elevator to bring car from storage stall to receiving stall in a manner similar to but in reverse order from the parking cycle.

In the block diagram of Fig. 14, the various programmed operations are under control of an electrical mechanism of which many are now well known and the circuits here used are believed to be unnecessary to illustrate in detail for a clear understanding of the invention. As one such program mechanism attention is called to U.S. Patent No. 2,736,852 as illustrative of what may be used in applicant's system.

It will now be apparent that a complete unitary self-operating and self-controlled system for parking motor vehicles has been devised wherein all handling of the cars, both for parking and deparking, is accomplished without having to employ a cashier or numbers of attendants as now required in known systems. Further safeguards are provided to protect a careless driver who may fail to carry out the simple steps to initiate operation of the system, such for example as leaving his car in gear or with the brakes on. Since the system is program controlled and uses a key for the respective parking and departing cycles provision is made to prevent the driver from removing the key until he has correctly taken the simple preliminary operations of getting his car in place ready for automatic handling.

The full details of the synchronizing or sequence control system are not included in the showing because they make use of well known circuits, relays, etc., and would greatly and unnecessarily complicate this disclosure. Any competent electrical engineer will be able to apply the circuits, relays, etc., necessary to accomplish the described programming or sequence of operations required in making use of the present invention.

While I have disclosed the invention in a preferred embodiment which is primarily useful in the garaging or storing of motor vehicles it is obvious that the principles of the invention can be readily applied to the storage of other units such as containers or boxes just so long as they are mounted on wheels, rollers or casters whereby they can roll freely from one position to another. Indeed, instead of being supplied with their own wheels, rollers or casters, suitable cradles, dollies or other rollable transferring units could be provided for the purpose. Such expedients could very readily be incorporated in a system which embodies the principles of my invention as defined in the appended claims.

I claim:

1. Equipment for parking and storing wheeled vehicles, comprising the combination of an elevator shaft, a vehicle stall communicating with said shaft, a pair of ramp rails in said stall to support a received vehicle, means mounting said rails for tilting movement to roll a received vehicle by gravity on its own wheels, an elevator in said shaft, means for raising and lowering said elevator, a pair of ramp rails on said elevator positioned for alignment with said stall rails, means mounting said elevator rails for tilting movement to roll a received vehicle by gravity on its own wheels, means associated with one of said pairs of rails and cooperating means associated with the other pair of rails whereby the two pairs of rails may be substantially linearly aligned upon movement of said elevator, means for coupling the aligned rails together, and means for moving the elevator to swing the coupled rails to an angle for gravity discharge of a vehicle on one of such pairs of rails.

2. Equipment for parking and storing wheeled vehicles, comprising the combination of an elevator shaft, a plurality of vehicle receiving stalls communicating with said shaft, a ramp in each stall to support a received vehicle, means respectively mounting said ramps to tilt a received vehicle for gravity rolling on its own wheels, an elevator in said shaft, a ramp on said elevator, means mounting said elevator ramp to tilt a received vehicle for gravity rolling on its own wheels, means associated with said elevator ramp and cooperating means associated with said stall ramps whereby a selected stall ramp may be substantially linearly aligned with the elevator ramp upon movement of the elevator, means to stop said elevator with said ramps aligned, means coupling said aligned ramps together, and means for moving said elevator to swing the coupled ramps to an angle for gravity discharge of a vehicle on its own wheels on one of said ramps.

3. Parking equipment according to claim 2 wherein means uncouples said ramps after said discharge.

4. Equipment for parking and storing vehicles, comprising the combination of an elevator shaft, a receiving stall communicating with said shaft, a vehicle receiving ramp in said stall, means pivoting said ramp to tilt a received vehicle with its center of gravity on the receiving side of said pivotal, stop means holding said vehicle in tilted position, an elevator in said shaft, means for raising and lowering said elevator, a ramp on said elevator for alignment with said stall ramp, means mounting said elevator ramp for tilting movement, means associated with said elevator ramp and cooperating means associated with said stall ramp whereby the said ramps may be substantially linearly aligned upon movement of the elevator and means for coupling the aligned ramps together to tilt as a unit to an angle for gravity discharge of said vehicle.

5. Parking equipment according to claim 4, wherein means uncouples the two pairs of ramps after discharge of the vehicle.

6. Parking equipment according to claim 4, wherein the stop means is a pair of stops spaced lengthwise of said ramp including a control for successive operation of said stops.

7. Equipment for parking and storing wheeled vehicles comprising an elevator shaft, a vehicle receiving stall communicating with said shaft, a plurality of storage stalls communicating with said shaft at different levels, a ramp in said receiving stall pivoted to tilt a received vehicle to roll by gravity on its own wheels towards the receiving end of said stall, a pair of stops pivoted on said ramp to swing into the path of the lower level vehicle wheels, a second pair of stops pivoted on said ramp back of said first pair of stops and aligned therewith, circuit means including electric motors for respectively raising said stops simultaneously to stop position, control means for lowering the wheel engaging pair of stops to release said vehicle to roll by gravity on its wheels whereby to bring them into contact with said second pair of stops, an elevator in said shaft, means including an electric circuit for operating said elevator, means operated in the second stop position of said vehicle for operating said elevator, a tiltable ramp on said elevator aligned with said stall ramp, means actuated by the rising movement of said elevator for interconnecting said ramps, and means for lowering said elevator to reverse the tilt of the loaded ramp, whereby the vehicle rolls by gravity on its own wheels onto the elevator ramp.

8. Parking equipment according to claim 7, wherein a switch on the second pair of stops closes one portion of said elevator circuit by wheel contact and a key controlled switch finally closes said circuit.

9. Parking equipment according to claim 7, wherein said ramp interconnecting means includes projectable bolts and bolt guides.

10. Parking equipment according to claim 9, wherein means are provided to project said bolts during the rise of said elevator and retract said bolts after the vehicle is on said elevator ramp.

11. Parking equipment according to claim 10 wherein a circuit operates to cause the loaded elevator to rise into register with a selected storage stall.

12. Parking equipment according to claim 11 wherein means actuates said interconnecting means at an empty storage stall.

13. Equipment for parking and storing a rollable vehicle, comprising a vehicle receiving or entrance stall, vehicle supporting means in the stall mounted for fore and aft tilting movement, stop means limiting entrance movement of the vehicle, stop means preventing reverse movement of the vehicle after entrance has been effected, said two stop means being sufficiently spaced to provide for a slight degree of movement of the vehicle therebetween, an elevator in alignment with said receiving stall adapted to accept a vehicle therefrom, movable vehicle stop means on the elevator, a coin controlled program mechanism including a removable parking key, said mechanism having a sensing device adapted to be actuated by contact with the vehicle upon free gravity rolling of the vehicle after entrance on said supporting means, means preventing removal of the key until after said gravity rolling has occurred, and means for moving the elevator to vehicle receiving position, lowering the entrance limiting stop, tilting the vehicle supporting means to effect gravity discharge of the vehicle from the receiving stall to the elevator, and moving the stop on the elevator to properly position the vehicle thereon.

14. Equipment for parking and storing a rollable vehicle, comprising a vehicle receiving or entrance stall, vehicle supporting means in the stall mounted for fore and aft tilting movement, stop means limiting entrance movement of the vehicle, a sensing device adapted to determine whether the vehicle is freely rollable, an elevator in alignment with said receiving stall adapted to accept a freely rollable vehicle therefrom, movable vehicle stop means on the elevator, a coin controlled program mechanism including a removable parking key, means preventing removal of the key until after the vehicle is determined to be freely rollable, and means for moving the elevator to vehicle receiving position, lowering the entrance limiting stop, tilting the vehicle supporting means to effect free rolling of the vehicle from the receiving stall to the elevator, and moving the stop on the elevator to properly position the vehicle thereon.

15. Equipment for parking and storing wheeled vehicles comprising an elevator, a vehicle stall adjacent thereto, vehicle supporting means in the stall, vehicle supporting means on the elevator, each of said supporting means being pivotally mounted to tilt a received vehicle to roll by gravity on its own wheels, movable stop means adapted to control rolling movements of the vehicle, means for coupling said two vehicle supporting means together, said coupling means including a bolt on one supporting means and a cooperating receiving socket on the other, together with means for initially partially projecting the bolt and locating it with respect to the socket and then projecting the bolt into the socket to complete the coupling, means timed with relation to the completed coupling for moving the elevator and tilting the coupled supporting means as a unit to an angle for gravity rolling of a vehicle from one supporting means to the other, and means timed with relation to said coupling and said tilting for moving stop means as required to permit and control the desired rolling movement of the vehicle.

16. Equipment for parking and storing wheeled vehicles comprising an elevator, a vehicle stall adjacent thereto, vehicle supporting means in the stall, vehicle supporting means on the elevator, each of said vehicle supporting means being pivotally mounted to tilt a received vehicle to roll by gravity on its own wheels, a member partially projectable from one supporting means and adapted to engage the other and substantially linearly align the two supporting means as the elevator moves, a socket on said other supporting means adapted to receive the projectable member when said aligning is effected, means timed with relation to the completed alignment for fully projecting said member into said socket, and means timed with relation to the completed projection for moving the elevator and tilting the coupling supporting means as a unit to the angle required for gravity rolling of a vehicle from one supporting means to the other.

17. Equipment according to claim 16 wherein the projectable member is a bolt and wherein the receiving socket is formed with an aligning slot adapted to receive the partially projected bolt and, further, wherein means are provided for completing projection of the bolt following the alignment of the bolt with the socket.

18. Equipment according to claim 17 wherein each of said vehicle supporting means includes a pair of spaced ramp rails on which the vehicle wheels are adapted to ride and wherein the rails on one supporting means carry a projectable bolt and the opposed rails on the other supporting means carry a socket with an aligning slot.

19. Equipment for parking and storing wheeled vehicles comprising an elevator, a vehicle stall adjacent thereto, vehicle supporting means in the stall, vehicle supporting means on the elevator, each of said vehicle supporting means being pivotally mounted to tilt a received vehicle to roll by gravity on its own wheels, a member projectable from one supporting means and adapted to engage the other and substantially linearly align the two supporting means as the elevator moves, means for coupling said two supporting means to tilt as a unit after alignment has been effected, and means for moving the elevator and tilting the coupled supporting means to the angle required for gravity rolling of a vehicle from one supporting means to the other.

References Cited in the file of this patent

UNITED STATES PATENTS

| | | |
|---|---|---|
| 1,288,567 | Hall | Dec. 24, 1918 |
| 1,925,442 | Fournier | Sept. 5, 1933 |
| 2,663,446 | Romain | Dec. 22, 1953 |
| 2,691,448 | Lontz | Oct. 12, 1954 |

FOREIGN PATENTS

| | | |
|---|---|---|
| 717,018 | Great Britain | Oct. 20, 1954 |

UNITED STATES PATENT OFFICE

CERTIFICATE OF CORRECTION

Patent No. 2,915,203 December 1, 1959

John Kurmer

It is hereby certified that error appears in the printed specification of the above numbered patent requiring correction and that the said Letters Patent should read as corrected below.

Column 6, line 25, for "stalll" read -- stall --; column 10, line 1, for "pivotal" read -- pivot --; column 12, lines 10 and 11, for "coupling suppotring" read -- coupled supporting --.

Signed and sealed this 26th day of July 1960.

(SEAL)
Attest:

KARL H. AXLINE
Attesting Officer

ROBERT C. WATSON
Commissioner of Patents